US005802110A

United States Patent [19]
Watanabe et al.

[11] Patent Number: 5,802,110
[45] Date of Patent: Sep. 1, 1998

[54] WIRELESS MOBILE SYSTEM

[75] Inventors: Masatoshi Watanabe, Tokyo; Kazuyuki Miya, Machida; Osamu Kato, Yokohama, all of Japan

[73] Assignee: Matsushita Electric Industrial Co., Ltd., Osaka, Japan

[21] Appl. No.: 385,961

[22] Filed: Feb. 9, 1995

[30]  Foreign Application Priority Data

Feb. 16, 1994  [JP]  Japan .................. 6-019367

[51] Int. Cl.⁶ .................. H04L 27/00; H04K 1/00
[52] U.S. Cl. .................. 375/259; 375/202; 455/54.1; 455/69
[58] Field of Search .................. 375/200, 201, 375/205, 202, 206, 295, 259, 364, 363, 345, 362, 297, 316; 379/98; 455/33.1, 54.1, 69; 370/18, 19, 20, 184–188, 522, 525, 526, 342, 318

[56]  References Cited

U.S. PATENT DOCUMENTS

| | | | |
|---|---|---|---|
| 4,222,115 | 9/1980 | Cooper et al. | 455/54.1 |
| 5,056,109 | 10/1991 | Gilhousen | 375/202.05 |
| 5,103,459 | 4/1992 | Gilhousen et al. | 375/205 |
| 5,216,692 | 6/1993 | Ling | 455/69 |
| 5,309,474 | 5/1994 | Gilhousen et al. | 375/205 |
| 5,412,686 | 5/1995 | Ling | 375/200 |
| 5,459,760 | 10/1995 | Watanabe | 375/202 |
| 5,485,486 | 1/1996 | Gilhousen et al. | 375/205 |
| 5,566,165 | 10/1996 | Sawahashi et al. | 370/208 |

FOREIGN PATENT DOCUMENTS 4-502841  5/1992  Japan .
2 268 365  1/1994  United Kingdom .

OTHER PUBLICATIONS

Gilhousen et al, "IEEE Transaction on Vehicular Technology," vol. 40, No. 2, 1991.

S. Tomisato et al., "Coherent Hybrid DS–FFH CDMA", Technical Report of IEICE, RCS92–109, 1993–01, pp. 61–66.

R. Esmailzadeh et al., "Power Control in Packet Switched Time Division Duplex Direct Sequence Spread Spectrum Communications", IEEE, 1992, pp. 989–992.

Primary Examiner—Tesfaldet Bocure
Attorney, Agent, or Firm—Spencer & Frank

[57]  ABSTRACT

A base station transmits a first signal spread according to a direct spread scheme and having carrier frequencies hopped between two frequencies f1 and f2. In a mobile station, output signals of two carrier generators are changed over by a change-over switch. When the signal transmission frequency in the base station is f1, the mobile station receives the first signal having the frequency f1 and transmits a second signal having the frequency f2. When the signal transmission frequency in the base station is f2, the mobile station receives the first signal having the frequency f2 and transmits the second signal having the frequency f1. A received power level detector in the mobile station detects a power level of the first signal received during each hop (the duration of the same frequency), and, on the basis of the detected power level, a transmission power level control circuit controls the power level of the second signal to be transmitted during the next hop, that is, at the time of transmission of the second signal having the same carrier frequency as that of the first signal whose power level has been detected.

18 Claims, 6 Drawing Sheets

FORWARD - LINK
(BASE STATION → MOBILE STATION)

REVERSE LINK
(MOBILE STATION → BASE STATION)

FORWARD-LINK
(BASE STATION → MOBILE STATION)

REVERSE LINK
(MOBILE STATION → BASE STATION)

WIRELESS MOBILE SYSTEM

BACKGROUND OF THE INVENTION

1. Field of the Invention

This invention relates to a wireless mobile system, such as, a digital land mobile radio-telephone, a portable telephone or the like used for radio communication of speech information.

2. Description of the Related Art

A CDMA (code division multiple access) scheme is one of multiple access schemes proposed hitherto so that a plurality of radio stations can simultaneously make radio communication between them in the same frequency band. An FDMA (frequency division multiple access) scheme and a TDMA (time division multiple access) scheme are known as other schemes. The CDMA scheme is advantageous over the FDMA scheme and the TDMA scheme in that it exhibits higher efficiency of frequency utilization and can accommodate more users.

In the CDMA scheme, the multiple access is made by means of spread spectrum communication in which, prior to transmission of an information signal, the spectrum of the information signal is spread over a band sufficiently wide as compared to the original bandwidth of the information signal. A direct spread scheme refers to a scheme in which an information signal is directly multiplied by a spreading code in a spreading process. A frequency hopping scheme refers to a scheme in which a carrier frequency of a signal modulated by information is changed over in a discrete mode within a given frequency band. A hybrid CDMA scheme refers to a CDMA scheme in which the direct spread scheme and the frequency hopping scheme are combined, as described in a paper entitled "COHERENT HYBRID DS-FFH CDMA" (S. TOMISATO, K. FUGAWA, H. SUZUKI, Technical Report of IEICE, RCS92–109, pp. 61–66, 1993–01).

The CDMA scheme using the direct spread scheme may encounter the so-called "near-far problem" resulting in impossibility of communication between a mobile station and a transmission station, with which the user desires to make communication, when the desired transmission station is located remote from the mobile station while a non-desired transmission station (an interference station) is located near the mobile station. This is because the power level of a signal received from the interference station is higher than that of a signal received from the desired transmission station, and the amount of the processing gain (the spread gain) is not enough to suppress the cross-correlation between the spreading codes. Thus, in a cellular system based on the CDMA scheme using the direct spread scheme, it is essentially required to control the transmission power according to the state of each transmission channel in the reverse link from the mobile station to the base station.

Further, in order to deal with fading resulting in degradation of the circuit quality in the case of land mobile communication, a method has been proposed for controlling the transmission power so as to compensate for variations of the instantaneous value of the received power level.

Figure 1A:
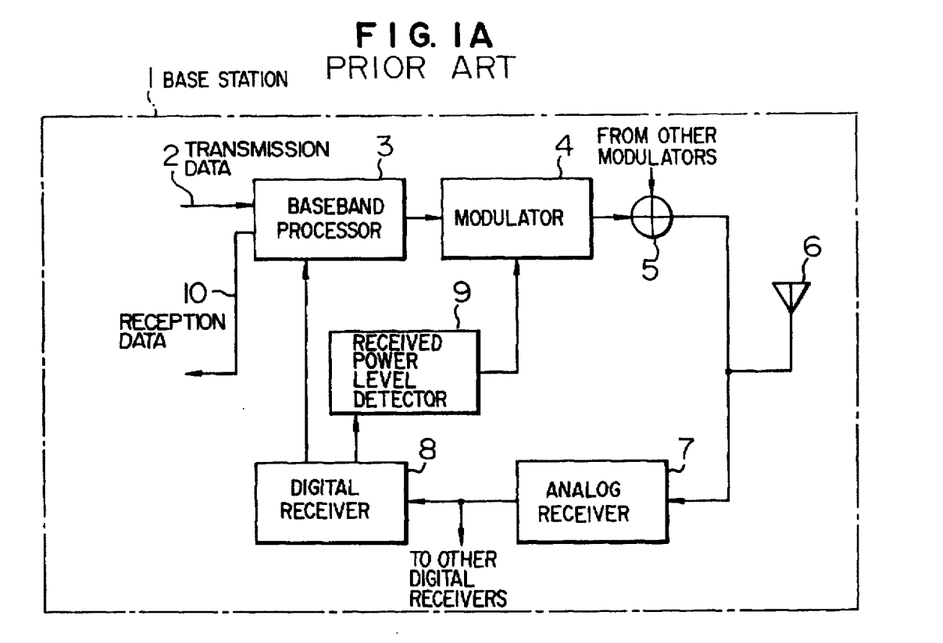
FIGS. 1A and 1B are block diagrams showing the structure of a prior art wireless mobile system based on an FDD scheme.
Figure 1B:
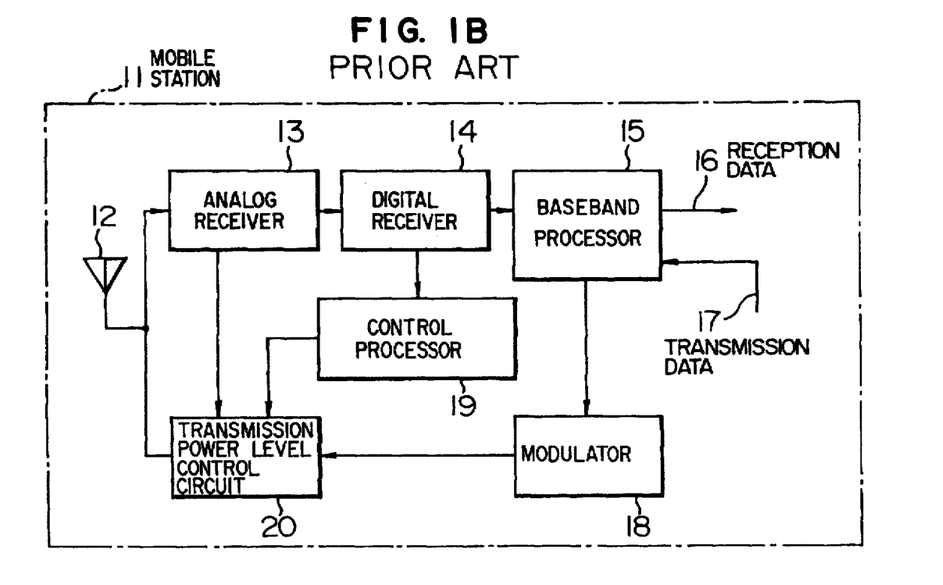

JP-A-4-502841 discloses one structure of a system for controlling the transmission power in a cellular system based on the CDMA scheme using the direct spread scheme. FIGS. 1A and 1B show the structure of the disclosed system. In FIG. 1A, the reference numerals 1, 2, 3, 4, 5, 6, 7, 8, 9 and 10 designate a base station, a transmission data to be transmitted, a baseband processor, a modulator, an adder, an antenna, an analog receiver, a digital receiver, a received power level detector and a reception data, respectively. In FIG. 1B, the reference numerals 11, 12, 13, 14, 15, 16, 17, 18, 19 and 20 designate a mobile station, an antenna, an analog receiver, a digital receiver, a baseband processor, a reception data, a transmission data to be transmitted, a modulator, a control processor and a transmission power level control circuit, respectively.

In the structure shown in FIGS. 1A and 1B, different frequency bands are used for a forward link from the base station 1 to the mobile station 11 and a reverse link from the mobile station 11 to the base station 1. This method is called an FDD (frequency division duplex) scheme and has such features among others that both the transmitter and the receiver can be simultaneously operated, and the transmitter does not interfere with the operation of the receiver.

In the case of the FDD scheme in which different frequency bands are used for the reverse link and the forward link, the center values of the levels of the received electric fields show gentle variation which are generally the same in both the reverse link and the forward link, but variations of the instantaneous value due to fading are not the same. Therefore, the method for controlling the transmission power is such that the overall power level received at the mobile station 11 is first detected by the digital receiver 14, and the detected power level is used to control the transmission power level by the transmission power level control circuit 20, thereby compensating for variations of the center value of the power level received from the base station 1. This method is called an open-loop transmission power control method. Further, because the open loop only is not enough to attain the desired compensation for a variation of the instantaneous value, the received power level detector 9 in the base station 1 detects the power level of the signal received from the specific mobile station 11 after reception and separation of the multiplex signal. Then, on the basis of the result of detection by the received power level detector 9, the base station 1 fetches the state of the reverse link in the frequency band allocated to the reverse link, and the base station 1 transmits a signal for controlling the power level of a signal transmitted from the mobile station 11, so that a signal having the desired power level can be received by the base station 1. In response to the transmission power control signal transmitted from the base station 1, the transmission power level is further controlled in the mobile station 11 so as to attain the desired compensation for variation of the instantaneous value. This method is called a closed-loop transmission power control method.

As described above, the CDMA scheme using the FDD scheme attains the desired transmission power control by the combination of open loop and closed loop control methods.

However, in the case of the transmission power control in which the different frequency bands are used for the reverse link and the forward link, gentle variations of the center values of the levels of the received electric fields are generally the same in both the reverse link and the forward link, but variations of the instantaneous values due to fading are not the same. Thus, because of the necessity for the transmission power control based on the closed loop method, the base station 1 requires provision of means for detecting the power levels received from all the mobile stations so as to recognize the states of the reverse links and means for transmitting that information to all the mobile stations, resulting in complexity of the structure of the system. Further, in the method for controlling transmission power by the closed loop, the mobile stations are informed of the states of the reverse links with a delay time due to the time required for the received power level detection processing in the base station and also a delay time due to the necessity for propagation of that information to all the mobile stations. Thus, a desired variation compensation which is faster than the total delay time described above cannot be attained.

Figure 2:
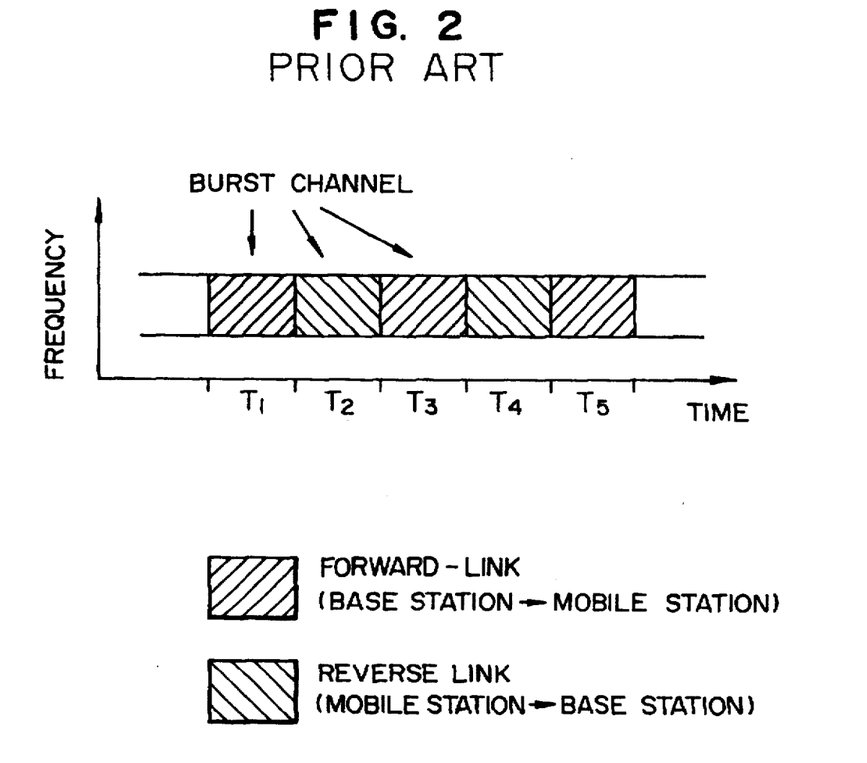
FIG. 2 shows the concept of arrangement of channels in a TDD scheme.

A paper entitled "POWER CONTROL IN PACKET SWITCHED TIME DIVISION DUPLEX DIRECT SEQUENCE SPREAD SPECTRUM COMMUNICATIONS" (R. ESMAILZADEH, M. NAKAGAWA, A. KAJIWARA, Proc. of VTC'92, pp. 989–992, 1992) describes a method for transmission power control based on a CDMA/TDD scheme. The term TDD (time division duplex) designates a scheme in which the same frequency band is used for signal transmission and reception. This TDD scheme is also called a ping-pong scheme, and the same radio frequency is used for signal transmission/reception in a time division mode. FIG. 2 shows the concept of the TDD scheme. At time T1, a base station participates in signal transmission, while a mobile station participates in signal reception, and, at time T2, the mobile station participates in signal transmission, while the base station participates in signal reception. Repetition of such a manner of signal transmission and signal reception realizes communication using a single frequency band.

Figure 3A:
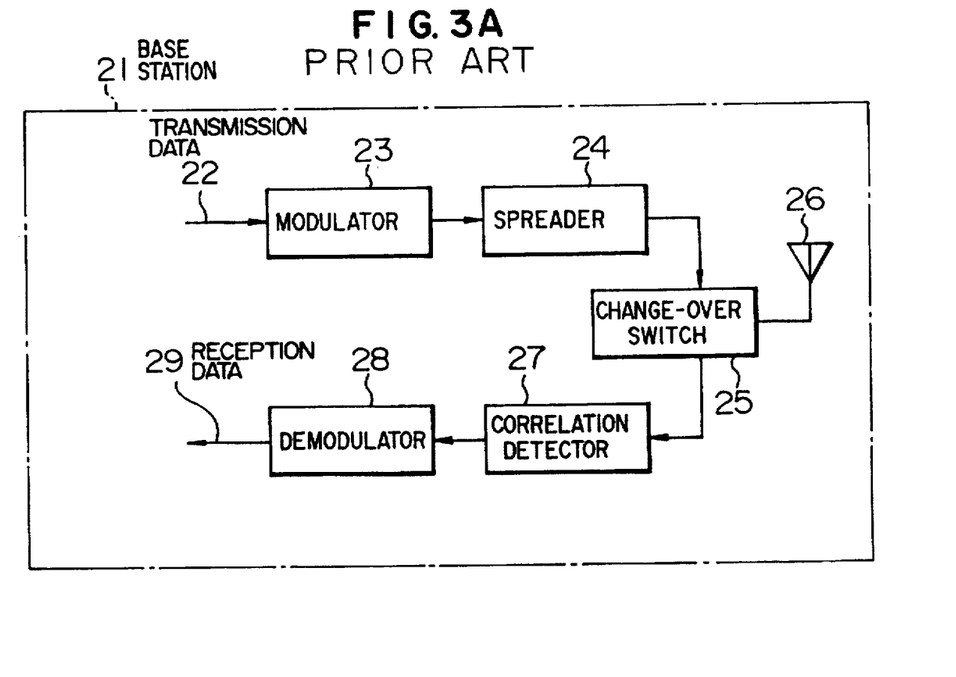
FIGS. 3A and 3B are block diagrams showing the structure of a prior art wireless mobile system based on the TDD scheme.
Figure 3B:
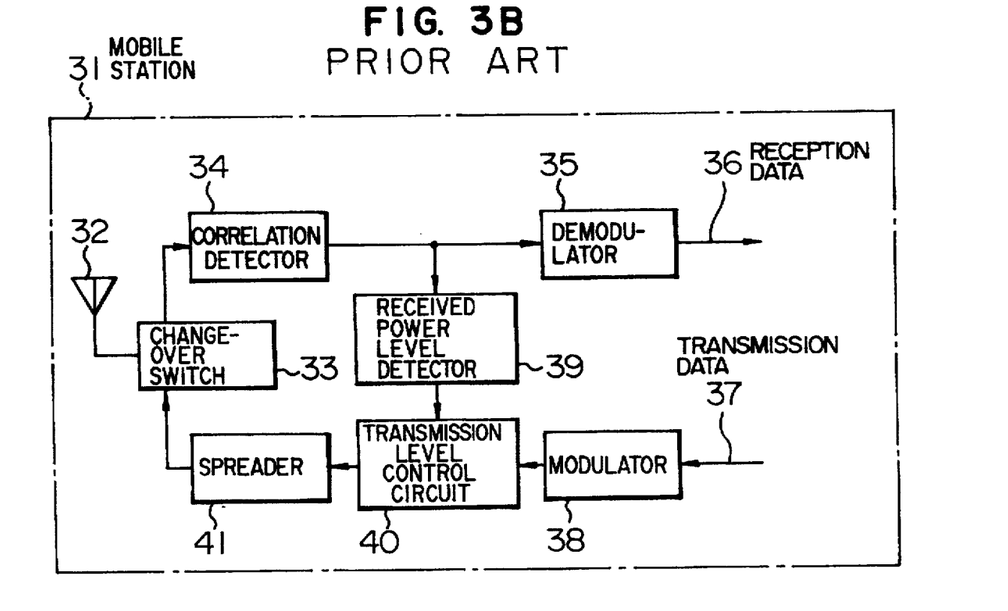

The transmission power control according to the CDMA/TDD scheme is based on open loop control only and will be described by reference to FIGS. 3A and 3B. In FIG. 3A, the reference numerals 21, 22, 23, 24, 25, 26, 27, 28 and 29 designate a base station, a transmission data to be transmitted, a modulator, a spreader, a change-over switch, an antenna, a correlation detector, a demodulator and a reception data, respectively. In FIG. 3B, the reference numerals 31, 32, 33, 34, 35, 36, 37, 38, 39, 40 and 41 designate a mobile station, an antenna, a change-over switch, a correlation detector, a demodulator, a reception data, a transmission data to be transmitted, a modulator, a received power level detector, a transmission power level control circuit and a spreader, respectively.

In the structure shown in FIGS. 3A and 3B, at the base station transmission/mobile station reception timing as shown at time T1 in FIG. 2, the change-over switch 25 is connected to the spreader 24 in the base station 21, while the change-over switch 33 is connected to the correlation detector 34 in the mobile station 31. In the base station 21, the transmission data 22 to be transmitted is modulated by the modulator 23 and then spread by the spreader 24 to be transmitted from the antenna 26. In the mobile station 31, the signal transmitted from the base station 21 through the transmission path is received by the antenna 32, and, after correlation detection by the correlation detector 34, the output signal of the correlation detector 34 is inputted to the demodulator 35 to reproduce the reception data 37. The output signal of the correlation detector 34 is also inputted to the received power level detector 39 which detects the power level of its own communication channel received by the mobile station 31. Then, at the mobile station transmission/base station reception timing as shown at time T2 in FIG. 2, the change-over switch 33 is now connected to the spreader 41 in the mobile station 31, while the change-over switch 25 is now connected to the correlation detector 27 in the base station 21. In the mobile station 31, the transmission data 37 to be transmitted is modulated by the modulator 38, and the transmission power level control circuit 40 determines the transmission power level on the basis of the output signal of the received power level detector 39 appearing at the time T1, so that the power level received by the base station 21 can be maintained constant without being affected by fading or the like. The output signal of the transmission power level control circuit 40 is spread by the spreader 41 to be transmitted from the antenna 32. In the base station 21, the multiplex signal transmitted from a plurality of mobile stations 31 through the transmission path is received by the antenna 26, and the signal from the specific mobile station 31 is separated by the correlation detection function of the correlation detector 27. The separated signal is then demodulated by the demodulator 28 to reproduce the reception data 29.

Thus, in the CDMA/TDD scheme in which the same frequency band is used for both the reverse-link and the forward link, variations of the distance of the radio path and variations of the instantaneous value due to fading are the same for both the reverse link and the forward link. Therefore, open-loop transmission power control as described above is merely required for attaining the desired compensation for variations which are slow relative to the TDD period.

However, in the transmission power control according to the CDMA/TDD scheme in which the same frequency band is used for both the reverse link and the forward link, the mobile station can recognize the state of the paths on the basis of only the signal received from the base station, so that the desired transmission power control can be attained by the use of the open loop only. But, due to the fact that, at the mobile station transmission/base station reception timing, the mobile station participating in the signal transmission only cannot recognize the state of the reverse link at that time and cannot follow up abrupt variations of the received power level even when the received power level is subjected to an abrupt variation due to, for example, shadowing by a building existing in the path. Especially, when the received power level sharply increases, the signal transmitted from this mobile station will adversely affect the system. Further, because each of the mobile stations detects, after the correlation detection by the correlation detector, the power level of the signal received through its own communication channel, a difference in the spreading codes between the individual mobile stations and a difference in the data transmitted to the individual mobile stations through their own communication channels result in a corresponding difference between the auto-correlation values and also a corresponding difference between the cross-correlation values. Thus, the accuracy of the received power level detection differs in the individual mobile stations. Also, because the transmission power level of the signal transmitted from the base station changes when the transmission power level is also controlled in the base station, the individual mobile stations cannot accurately recognize the state of the paths.

SUMMARY OF THE INVENTION

It is an object of the present invention to provide a wireless mobile system in which the transmission power level can be controlled at high speed and with high accuracy.

The present invention which attains the above object provides a wireless mobile system based on a hybrid CDMA scheme using the combination of a direct spread scheme and a frequency hopping scheme as a multiple access scheme in which a hopping pattern is selected so that a carrier frequency used for signal transmission through a forward link from a base station to a mobile station and another carrier frequency used for signal transmission through a reverse link from the mobile station to the base station may not overlap each other at the same time, and a first signal transmitted from the base station and a second signal transmitted from the mobile station are multiplexed in the same frequency band including the carrier frequencies.

In the wireless mobile system according to the present invention, a pilot channel common to all mobile stations is provided in addition to a communication channel used for communication through the forward link.

Therefore, according to the present invention, the same frequency band can be used for both the reverse link and the forward link, and, on the basis of the power level of the signal received from the base station, the mobile station can immediately recognize the state of the radio path, so that the transmission power can be controlled at high speed whose unit is the hop (duration of the same frequency).

Further, by the use of the pilot channel, the state of the radio path can be recognized independently of a variation of the power level of the signal transmitted from the base station through the communication channel. Therefore, an undesirable difference between the power levels received by the individual mobile stations due to, for example, the difference of the data modulation and the difference of the spreading codes can be avoided, so that the desired transmission power control can be achieved with further higher accuracy.

DESCRIPTION OF THE PREFERRED EMBODIMENTS

Figure 4:
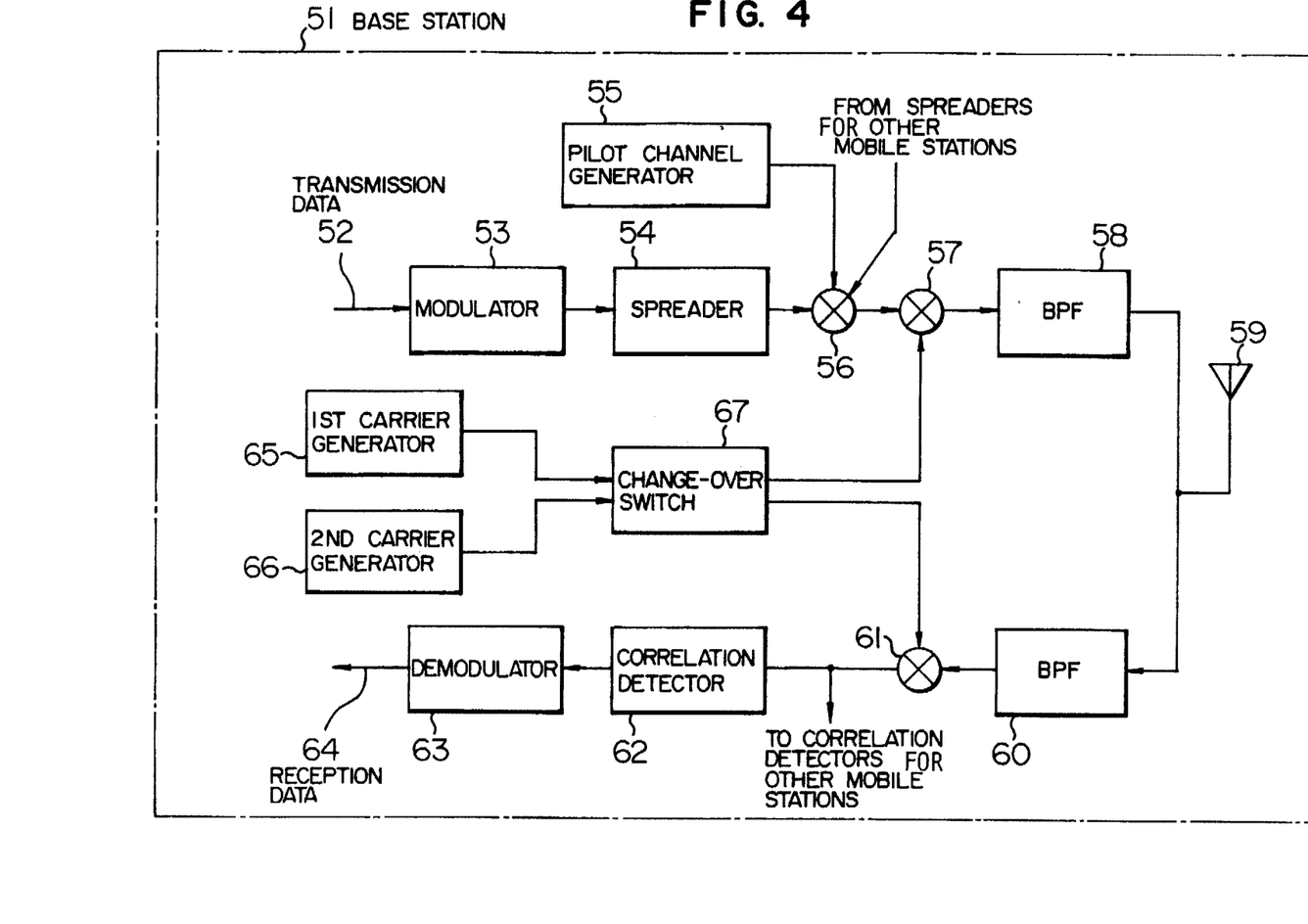
FIG. 4 is a block diagram showing the structure of a base station in an embodiment of the wireless mobile system according to the present invention.

An embodiment of the present invention will now be described by reference to FIGS. 4 and 5. FIG. 4 shows the structure of a base station generally designated by the reference numeral 51. Referring to FIG. 4, the base station 51 includes a modulator 53, a spreader 54, a pilot channel generator 55, an adder 56, a first multiplier 57, a transmission band-pass filter (BPF) 58, an antenna 59, a reception band-pass filter (BPF) 60, a second multiplier 61, a correlation detector 62, a demodulator 63, a first carrier generator 65, a second carrier generator 66, and a change-over switch 67.

Figure 5:
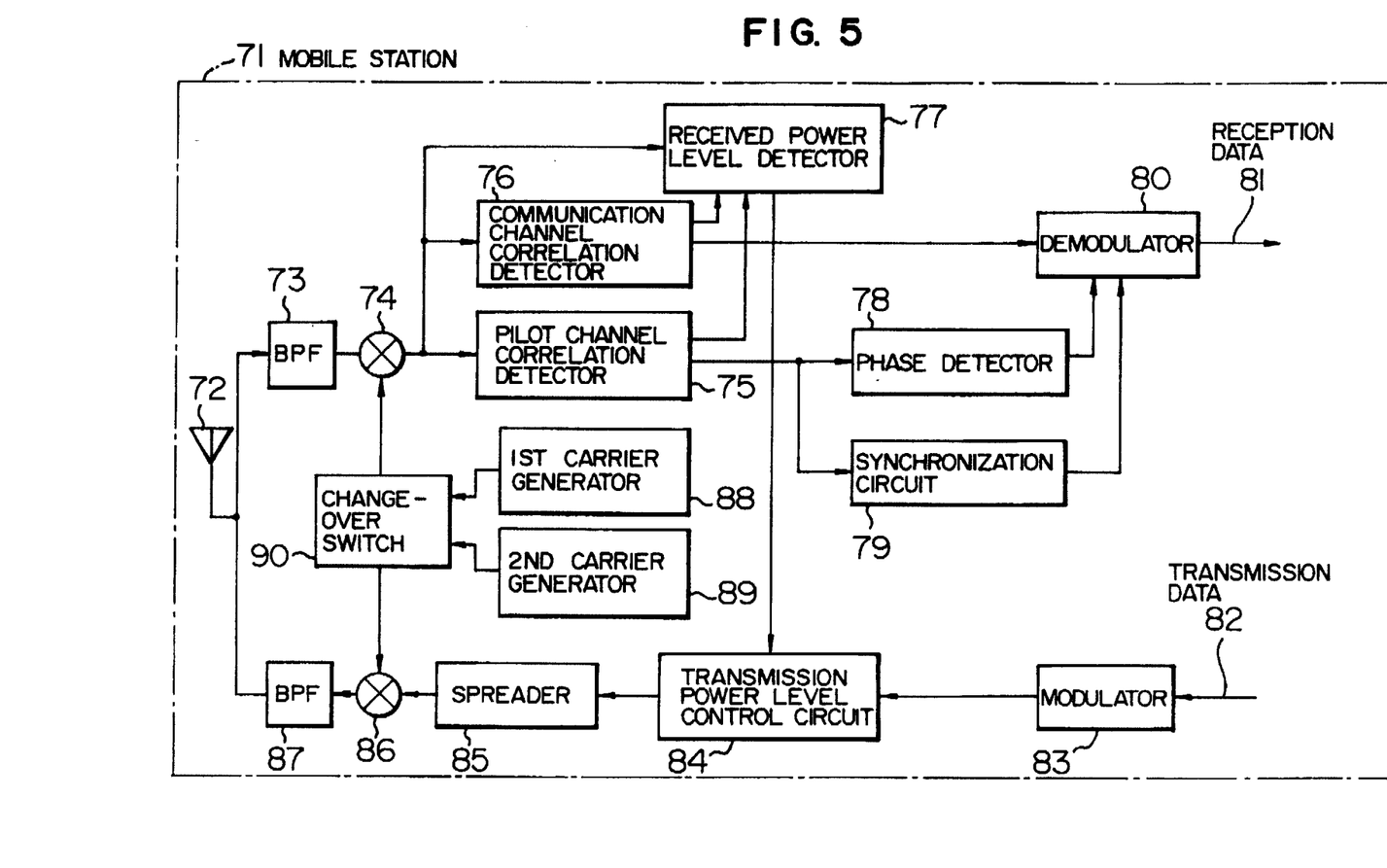
FIG. 5 is a block diagram showing the structure of a mobile station in the embodiment of the wireless mobile system according to the present invention.

FIG. 5 shows the structure of a mobile station generally designated by the reference numeral 71. Referring to FIG. 5, the mobile station 71 includes an antenna 72, a reception band-pass filter (BPF) 73, a first multiplier 74, a pilot channel correlation detector 75, a communication channel correlation detector 76, a received power level detector 77, a phase detector 78, a synchronization circuit 79, a demodulator 80, a modulator 83, a transmission power level control circuit 84, a spreader 85, a second multiplier 86, a transmission band-pass filter (BPF) 87, a first carrier generator 88, a second carrier generator 89, and a change-over switch 90. Usually, there are a plurality of such mobile stations 71 associated with such a single base station 51.

Figure 6:
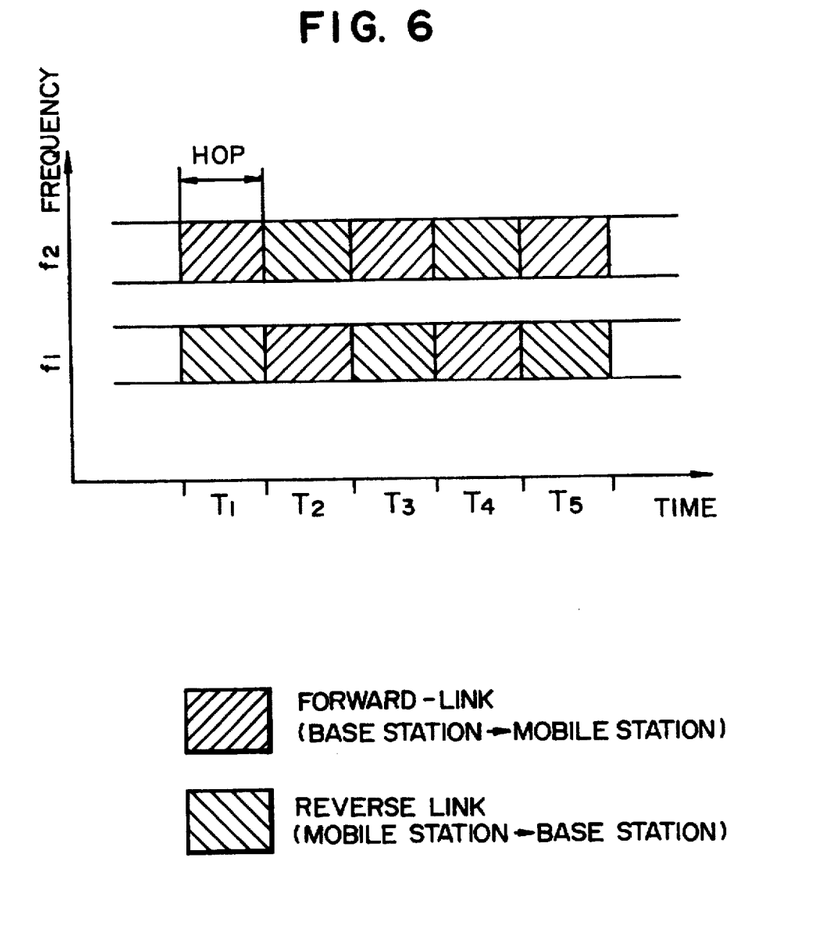
FIG. 6 shows the concept of arrangement of channels in the wireless mobile system embodying the present invention.

The wireless mobile system embodying the present invention uses a hybrid CDMA scheme as its multiple access scheme. In the system, a hopping pattern is selected so that a carrier frequency used for signal transmission through a forward link from the base station 51 to the mobile station 71 (a first communication channel) and another carrier frequency used for signal transmission through a reverse link from the mobile station 71 to the base station 51 (a second communication channel) may not overlap each other, and a transmission signal transmitted from the base station 51 to the mobile station 71 and a transmission signal transmitted from the mobile station 71 to the base station 51 are multiplexed in the same frequency band including these carrier frequencies. FIG. 6 shows the concept of frequency hopping between the two carrier frequencies f1 and f2 in the illustrated embodiment. At time T1, the base station 51 transmits the transmission signal whose carrier frequency is f2, while the mobile station 71 transmits the transmission signal whose carrier frequency is f1. At time T2, the base station 51 transmits the transmission signal whose carrier frequency is hopped from f2 to f1, while the mobile station 71 transmits the transmission signal whose carrier frequency is hopped from f1 to f2. The duration of the same carrier frequency is called one hop. The above manner of frequency hopping attains communication in which the same frequency band is used for both the reverse link and the forward link. When there are a plurality of such mobile stations 71, the multiple access based on the direct spread scheme is made while using the same hopping pattern.

In the base station 51, transmission data 52 to be transmitted to the mobile station 71 is modulated by the modulator 53 and then spread by the spreader 54 according to a spreading code allocated beforehand. In the adder 56, the output signal of the spreader 54 is multiplexed with output signals of spreaders in mobile stations (not shown in FIG. 4) and also with the output signal of the pilot channel generator 55. The pilot channel is synchronized with the first communication channel and is in the form of a fixed pattern, such as, a data pattern in which all the bits are "0" or "1". Such a fixed pattern is spread according to a specific spreading code, and the transmission power is maintained constant. The multiplexed signal is then multiplied by one of the carriers in the first multiplier 57, and the output signal of the first multiplier 57 is passed through the transmission BPF 58 to be transmitted from the antenna 59 to the transmission path. The first carrier generator 65 and the second carrier generator 66 generate the carriers having the frequencies f1 and f2, respectively. The change-over switch 67 changes over these carriers, so that the carrier having the frequency f2 is selected at time T1 in FIG. 6, while the carrier having the frequency f1 is selected at time T2 in FIG. 6.

At the signal receiving part of the base station 51, the signal received by the antenna 59 is passed through the reception BPF 60 and then multiplied by a carrier in the second multiplier 61, so that the signal frequency is converted from the RF band to the baseband. The carrier used for multiplying in this case is also one of the output signals of the first and second carrier generator 65 and 66. Contrary to the case of the signal transmission, the output signals of the carrier generator 65 and 66 are changed over by the change-over switch 67, so that the carrier having the frequency f1 is selected at time T1, while the carrier having the frequency f2 is selected at time T2. The output signal of the second multiplier 61 is inputted to the correlation detector 62 for each of the mobile stations 71. In the correlation detector 62 for the specific mobile station 71, the correlation is detected according to the same spreading code as that used in the spreader 85 in the mobile station 71 so as to separate, from the signal produced by multiplexing the signals outputted from the plural mobile stations 71, the signal transmitted through the second communication channel for the specific mobile station 71, and the signal so separated is inputted to the demodulator 63. The demodulator 63 demodulates the input signal to reproduce a reception data 64.

In the mobile station 71 shown in FIG. 5, the signal transmitted from the base station 51 through the transmission path is received by the antenna 72. The signal received is passed through the reception BPF 73 and then multiplied by a carrier in the first multiplier 74, so that the signal frequency is converted from the RF band to the baseband. The carrier is selected by changing over the output signals of the first and second carrier generator 88 and 89 by the change-over switch 90. As shown in FIG. 6, the carrier having the frequency f2 is selected at time T1, while the carrier having the frequency f1 is selected at time T2. The output signal of the first multiplier 74 is inputted to each of the pilot channel correlation detector 75, the communication channel correlation detector 76 and the received power level detector 77.

In the pilot channel correlation detector 75, the correlation is detected according to the spreading code used for spreading the pilot channel so as to separate the pilot channel, and the output signal of the pilot channel correlation detector 75 is inputted to each of the phase detector 78, the synchronization circuit 79 and the received power level detector 77. The phase detector 78 detects deviation of the phase due to, for example, fading of the pilot channel and offset of the frequency of the carriers of the transmitted and received signals, and the resultant output signal of the phase detector 78 is inputted to the demodulator 80. Because both the pilot channel and the first communication channel use the same carrier frequency and have the same transmission path, it is apparent that they show the same amount of phase deviation. Also, because the data pattern of the pilot channel is already known, the absolute phase can be easily detected. The synchronization circuit 79 acquires the timing of the data in the pilot channel, and the output signal of the synchronization circuit 79 is inputted to the demodulator 80.

The communication channel correlation detector 76 separates the first communication channel allocated to the specific mobile station 71 as a result of the correlation detection, and the output signal of the communication channel correlation detector 76 is inputted to each of the demodulator 80 and the received power level detector 77. The demodulator 80 corrects the phase of the first communication channel on the basis of the phase deviation signal inputted from the phase detector 78 and then demodulates the signal transmitted from the base station 51 on the basis of the timing fetched by the synchronization circuit 79, thereby producing a reception data 81.

The received power level detector 77 detects the three power levels, that is, the overall power level of the received signal given by the output signal of the first multiplier 74, the power level of the first communication channel given by the output signal of the communication channel correlation detector 76 and the power level of the pilot channel given by the output signal of the pilot channel correlation detector 75, and the output signal of the received power level detector 77 is inputted to the transmission power level control circuit 84.

At the transmitting part of the mobile station 71, transmission data 82 to be transmitted to the base station 51 is modulated by the modulator 83, and the output signal of the modulator 83 is inputted to the transmission power level control circuit 84. The transmission power level control circuit 84 controls the transmission power level on the basis of the three power levels detected by the received power level detector 77, and the output signal of the transmission power level control circuit 84 is inputted to the spreader 85. The manner of transmission power control by the transmission power level control circuit 84 will be described later. In the spreader 85, the input signal is spread according to the allocated spreading code, and the resultant signal is multiplied by one of the carriers in the second multiplier 86. The output signals of the first and second carrier generator 88 and 89 are changed over by the change-over switch 90, and, contrary to the case of signal reception, the carrier having the frequency f1 is used at time T1, while the carrier having the frequency f2 is used at time T2. The output signal of the second multiplier 86 is passed through the transmission BPF 87 to be transmitted from the antenna 72 to the transmission path.

The transmission power control in the illustrated embodiment of the present invention resorts to the open loop control only. First, the frequency f2 shown in FIG. 6 is noted. At time T1, the mobile station 71 receives from the base station 51 the signal whose carrier frequency is f2. At time T1, the pilot channel correlation detector 75 separates the pilot channel by the correlation detection, and the received power level detector 77 detects the average power level received during the period of one hop in the pilot channel. Also, after the correlation detection by the communication channel correlation detector 76, the received power level detector 77 detects the average power level received during the period of one hop in the first communication channel. The transmission power level control circuit 84 compares the detected value of one or both of the received power levels with a predetermined received power level to recognize the state of the forward link when the carrier frequency is f2. Then, the transmission power level control circuit 84 determines the transmission power level, so that the received power level at the base station 51 can be maintained at a predetermined constant value when the mobile station 71 transmits at time T2 the signal whose carrier frequency is f2.

At time T2, the mobile station 71 transmits the signal having the determined power level. During the period of the signal transmission, the received power level detector 77 detects the overall power level of the received signal appearing at the output of the first multiplier 74, and, on the basis of the detected overall power level of the signal received from the base station 51, the transmission power level is controlled so as to follow up a variation of the received power level. The value of the power level received at time T2 is that detected when the carrier frequency is f1, and the degree of fading differs from that of the signal being transmitted with the carrier frequency f2. Therefore, in this case, the system can deal with an abrupt variation of the received power level due to, for example, shadowing by a building. The above manner of processing is executed for both the two carrier frequencies f1 and f2, so that the desired transmission power control resorting to the open loop only can be achieved.

When, in the illustrated embodiment of the present invention, the transmission power level of the pilot channel is selected to be higher than that of the communication channel in the base station 51, the received power level of the pilot channel in the mobile station 71 can be detected with higher accuracy. Thus, the phase can be more easily detected, and the synchronization timing can be more easily fetched, so that the demodulation performance can be greatly improved.

What is claimed is:

1. A wireless mobile system having a base station and a mobile station wherein:

said base station comprises means for transmitting a first transmission signal to said mobile station over a first communication channel at a second carrier frequency during a first interval of time and at a first carrier frequency during a second interval of time, said second interval of time not overlapping said first interval of time; and pilot channel generator means for generating a pilot channel output signal synchronized with said first communications channel, the output signal of said pilot channel generating means comprising a fixed data pattern wherein all of the bits are either "0" or "1"; and said mobile station comprises means for transmitting a second transmission signal to said base station over a second communication channel allocated to the mobile station, said second transmission signal being transmitted at said first carrier frequency during said first interval of time and at said second carrier frequency during said second interval of time;

communication channel correlation detector means for performing a first correlation detection to separate said second communication channel from said first communication channel transmitting a reception signal, said reception signal being the first transmission signal received by said mobile station;

pilot channel correlation detector means for performing a second correlation detection to separate a pilot channel from said first communication channel;

received power level detector means for detecting a received power level of said pilot channel detected by said pilot channel correlation detector means at the first and second carrier frequencies of said first transmission signal, and for responding to the output of the communication channel correlation means; and transmission power level control means for controlling, based on the received power level of said pilot channel, a transmission power level at the time of transmission of said second transmission signal at a carrier frequency equal to a frequency of said received first transmission signal whereby a received power level of said second transmission signal at said base station is maintained at a predetermined constant value.

2. A wireless mobile system according to claim 1, wherein:

said received power level detector means further detects a received power level of said first communication channel at the first and second carrier frequencies of said received first transmission signal; and said transmission power level control means further controls the transmission power level of said second transmission signal based on the received power level of said first communication channel.

3. A wireless mobile system according to claim 2, wherein said mobile station further comprises:

synchronization means for acquiring a timing of a data in said pilot channel detected by said pilot channel correlation detector means; and demodulator means for demodulating, on the basis of said timing acquired by said synchronization means, a data of said communication channel separated by said communication channel correlation detector means.

4. A wireless mobile system according to claim 3, wherein said mobile station further comprises:

phase detector means for detecting a phase deviation of said reception signal from an output of said pilot channel correlation detector means; and said demodulator means demodulates, on the basis of said timing acquired by said synchronization means and said phase deviation detected by said phase detector means, a data of said communication channel separated by said communication channel correlation detector means.

5. A wireless mobile system according to claim 2, wherein said mobile station further comprises:

phase detector means for detecting a phase deviation of said reception signal from an output of said pilot channel correlation detector means; and demodulator means for demodulating, on the basis of said phase deviation detected by said phase detector means, a data of said communication channel separated by said communication channel correlation detector means.

6. A wireless mobile system according to claim 1, wherein:

said received power level detector means further detects a received power level of said reception signal;

said transmission power level control means further controls the transmission power level of said second transmission signal on the basis of the received power level of said reception signal; and when the transmission power level of said second transmission signal is controlled on the basis of the received power level of said reception signal, said transmission power level control means controls said transmission power level as soon as the received power level of said reception signal is detected.

7. A wireless mobile system according to claim 6, wherein said mobile station further comprises:

synchronization means for acquiring a timing of a data in said pilot channel detected by said pilot channel correlation detector means; and demodulator means for demodulating, on the basis of said timing acquired by said synchronization means, a data of said communication channel separated by said communication channel correlation detector means.

8. A wireless mobile system according to claim 7, wherein said mobile station further comprises:

phase detector means for detecting a phase deviation of said reception signal from an output of said pilot channel correlation detector means; and said demodulator means demodulates, on the basis of said timing acquired by said synchronization means and said phase deviation detected by said phase detector means, a data of said communication channel separated by said communication channel correlation detector means.

9. A wireless mobile system according to claim 6, wherein said mobile station further comprises:

phase detector means for detecting a phase deviation of said reception signal from an output said pilot channel correlation detector means; and demodulator means for demodulating, on the basis of said phase deviation detected by said phase detector means, a data of said communication channel separated by said communication channel correlation detector means.

10. A wireless mobile system according to claim 1, wherein:

said received power level detector means further detects a received power level of said communication channel separated by said communication channel correlation detector means at the carrier frequency of said received first transmission signal and a received power level of said reception signal;

said transmission power level control means controls the transmission power level of said second transmission signal on the basis of the received power level of said pilot channel, the received power level of said first communication channel separated by said communication channel correlation detector means and the received power level of said reception signal; and when the transmission power level of said second transmission signal is controlled on the basis of the received power level of said reception signal, said transmission power level control means controls said transmission power level as soon as the received power level of said reception signal is detected.

11. A wireless mobile system according to claim 10, wherein said mobile station further comprises:

synchronization means for acquiring a timing of a data in said pilot channel detected by said pilot channel correlation detector means; and demodulator means for demodulating, on the basis of said timing acquired by said synchronization means, a data of said communication channel separated by said communication channel correlation detector means.

12. A wireless mobile system according to claim 11, wherein said mobile station further comprises:

phase detector means for detecting a phase deviation of said reception signal from an output of said pilot channel correlation detector means; and said demodulator means demodulates, on the basis of said timing acquired by said synchronization means and said phase deviation detected by said phase detector means, a data of said communication channel separated by said communication channel correlation detector means.

13. A wireless mobile system according to claim 10, wherein said mobile station further comprises:

phase detector means for detecting a phase deviation of said reception signal from an output of said pilot channel correlation detector means; and demodulator means for demodulating, on the basis of said phase deviation detected by said phase detector means, a data of said communication channel separated by said communication channel correlation detector means.

14. A wireless mobile system according to claim 1, wherein said mobile station further comprises:

synchronization means for acquiring a timing of data in said pilot channel detected by said pilot channel correlation detector means; and demodulator means for demodulating, on the basis of said timing acquired by said synchronization means, data of said first communication channel separated by said communication channel correlation detector means.

15. A wireless mobile system according to claim 14, wherein said mobile station further comprises:

phase detector means for detecting a phase deviation of said reception signal from an output of said pilot channel correlation detector means; and said demodulator means demodulates, on the basis of said timing acquired by said synchronization means and said phase deviation detected by said phase detector means, a data of said communication channel separated by said communication channel correlation detector means.

16. A wireless mobile system according to claim 1, wherein said mobile station further comprises:

phase detector means for detecting a phase deviation of said reception signal from an output of said pilot channel correlation detector means; and demodulator means for demodulating, on the basis of said phase deviation detected by said phase detector means, a data of said communication channel separated by said communication channel correlation detector means.

17. A wireless mobile system having a base station and a mobile station wherein:

said base station comprises means for transmitting a first transmission signal to said mobile station over a first communication channel at a second carrier frequency during a first interval of time and at a first carrier frequency during a second interval of time, said second interval of time not overlapping said first interval of time; and said mobile station comprises means for transmitting a second transmission signal to said base station over a second communication channel allocated to the mobile station, said second transmission signal being transmitted at said first carrier frequency during said first interval of time and at said second carrier frequency during said second interval of time;

communication channel correlation detector means for performing a first correlation detection to separate said second communication channel from said first communication channel transmitting a reception signal, said reception signal being the first transmission signal received by said mobile station;

received power level detector means for detecting a received power level of the communication channel separated by said communication channel correlation detector means at the first and second carrier frequencies of said first transmission signal; and transmission power level control means for controlling, based on the received power level of said communication channel, a transmission power level at the time of transmission of said second transmission signal at a carrier frequency equal to a frequency of said received first transmission signal whereby a received power level of said second transmission signal at said base station is maintained at a predetermined constant value.

18. A wireless mobile system according to claim 17, wherein:

said received power level detector means detects a received power level of said reception signal;

said transmission power level control means controls the transmission power level of said second transmission signal on the basis of the received power level of said communication channel and the received power level of said reception signal both of which are detected by said received power level detector means; and when the transmission power level of said second transmission signal is controlled on the basis of the received power level of said reception signal, said transmission power level control means controls said transmission power level as soon as the received power level of said reception signal is detected.

* * * * *